(12) United States Patent
Ballu

(10) Patent No.: US 10,028,499 B2
(45) Date of Patent: Jul. 24, 2018

(54) APPARATUS, ASSEMBLY AND METHOD FOR MANUAL AND LOCALIZED WEEDING

(71) Applicant: EXEL INDUSTRIES, Epernay (FR)

(72) Inventor: Patrick Ballu, Reims (FR)

(73) Assignee: EXEL INDUSTRIES, Epernay (FR)

( * ) Notice: Subject to any disclaimer, the term of this patent is extended or adjusted under 35 U.S.C. 154(b) by 0 days.

(21) Appl. No.: 15/086,517

(22) Filed: Mar. 31, 2016

(65) Prior Publication Data

US 2016/0205919 A1 Jul. 21, 2016

Related U.S. Application Data

(62) Division of application No. 13/533,211, filed on Jun. 26, 2012, now Pat. No. 9,345,239.

(30) Foreign Application Priority Data

Jul. 1, 2011 (FR) ...................................... 11 55977

(51) Int. Cl.
*A01M 21/04* (2006.01)

(52) U.S. Cl.
CPC .................................. *A01M 21/04* (2013.01)

(58) Field of Classification Search
CPC .......... A01G 1/00; A01C 23/00; A01C 23/02; A01C 1/00; A01B 79/00; A01B 79/02; A01M 21/00; A01M 21/04
USPC .......................... 47/58.1 R; 111/7.2, 7.4, 127
See application file for complete search history.

(56) References Cited

U.S. PATENT DOCUMENTS

| 3,902,273 A | * | 9/1975 | Friedman | A01G 7/00 47/1.3 |
| 3,945,370 A | | 3/1976 | Essington | |
| 6,029,589 A | * | 2/2000 | Simpson | A01M 21/04 111/127 |
| 6,394,009 B1 | * | 5/2002 | Yonat | A01G 11/00 110/241 |
| 7,507,086 B2 | | 3/2009 | Jaulent | |
| 2003/0136048 A1 | * | 7/2003 | Newson | A01M 21/04 47/1.3 |
| 2005/0143259 A1 | * | 6/2005 | Newson | A01M 3/007 504/116.1 |
| 2005/0214705 A1 | * | 9/2005 | Jaulent | A01M 15/00 431/354 |
| 2006/0188241 A1 | * | 8/2006 | Higham | A01M 1/2094 392/473 |

(Continued)

FOREIGN PATENT DOCUMENTS

| CN | 2191534 | 3/1995 |
| CN | 2607024 | 3/2004 |

(Continued)

*Primary Examiner* — Monica L Williams
(74) *Attorney, Agent, or Firm* — Dowell & Dowell, P.C.

(57) ABSTRACT

This manual and localized weeding apparatus (1) comprises a heat generator (4) which is attached to a rod (2). The heat generator (4) comprises a fan and a heating resistor projecting a hot air jet (J1) into an inner volume (V5) of a bell (5) provided with a free edge (551) for supporting the apparatus (1) on the ground. According to the invention, the bell (5) is provided with at least one hole for discharging an air jet (J2) from the inner volume (V5) of the bell (5). The hole is separated from the free edge (551) by a distance of more than 2 cm.

12 Claims, 5 Drawing Sheets

(56) References Cited

U.S. PATENT DOCUMENTS

2007/0227418 A1* 10/2007 Polfer .................... A01B 39/18
111/127
2010/0129157 A1* 5/2010 Reddy ................. A01M 17/002
405/128.7
2011/0203502 A1* 8/2011 Cink .................... A01C 23/028
111/127

FOREIGN PATENT DOCUMENTS

| | | | |
|---|---|---|---|
| CN | 201690944 | 1/2011 | |
| GB | 2122511 | 1/1984 | |
| GB | 2278988 | 12/1994 | |
| WO | 9114363 | 10/1991 | |
| WO | WO 9114363 A1 * | 10/1991 | ............ A01M 21/04 |
| WO | WO 2010/106024 | * 3/2010 | |

* cited by examiner

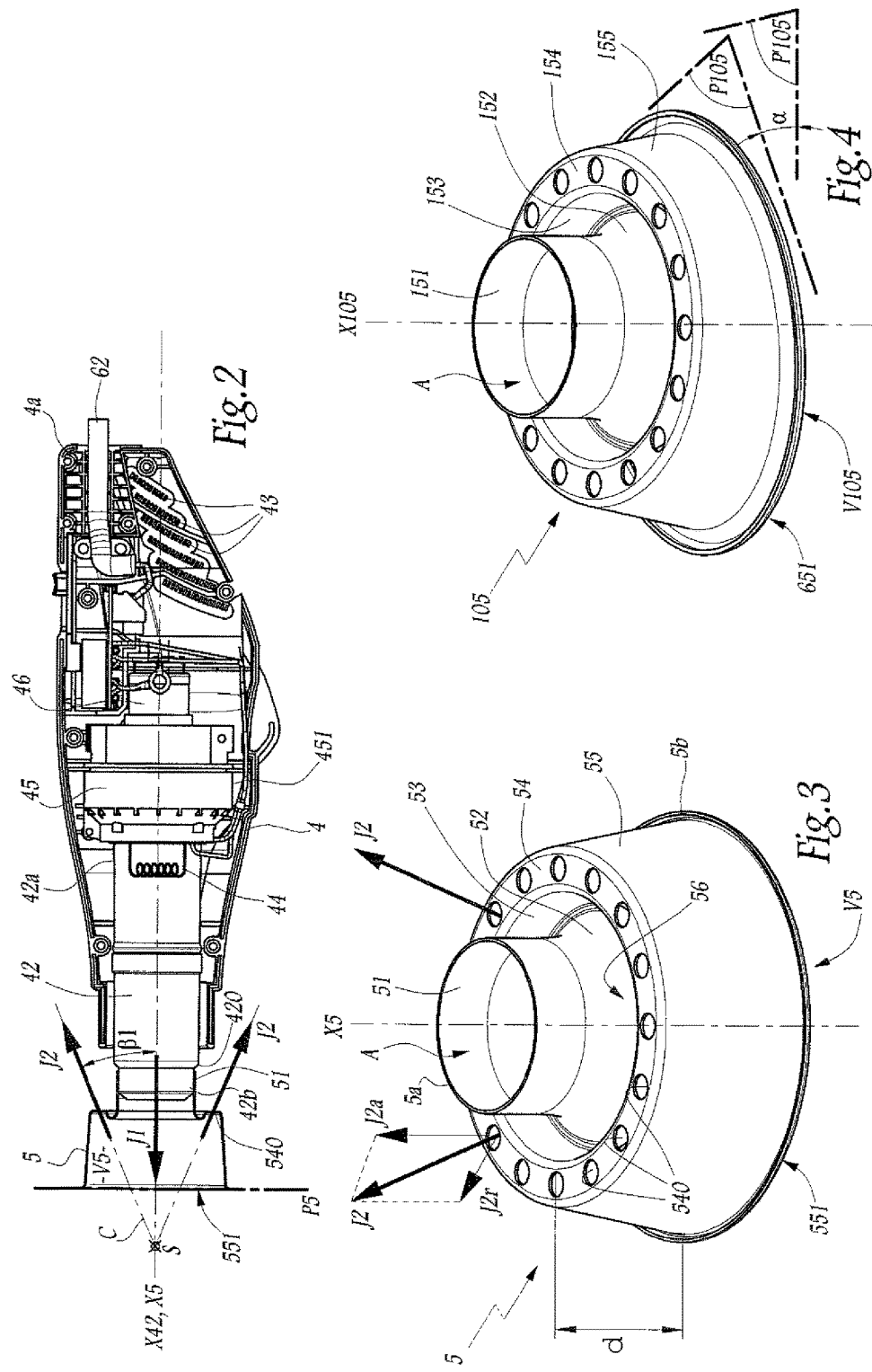

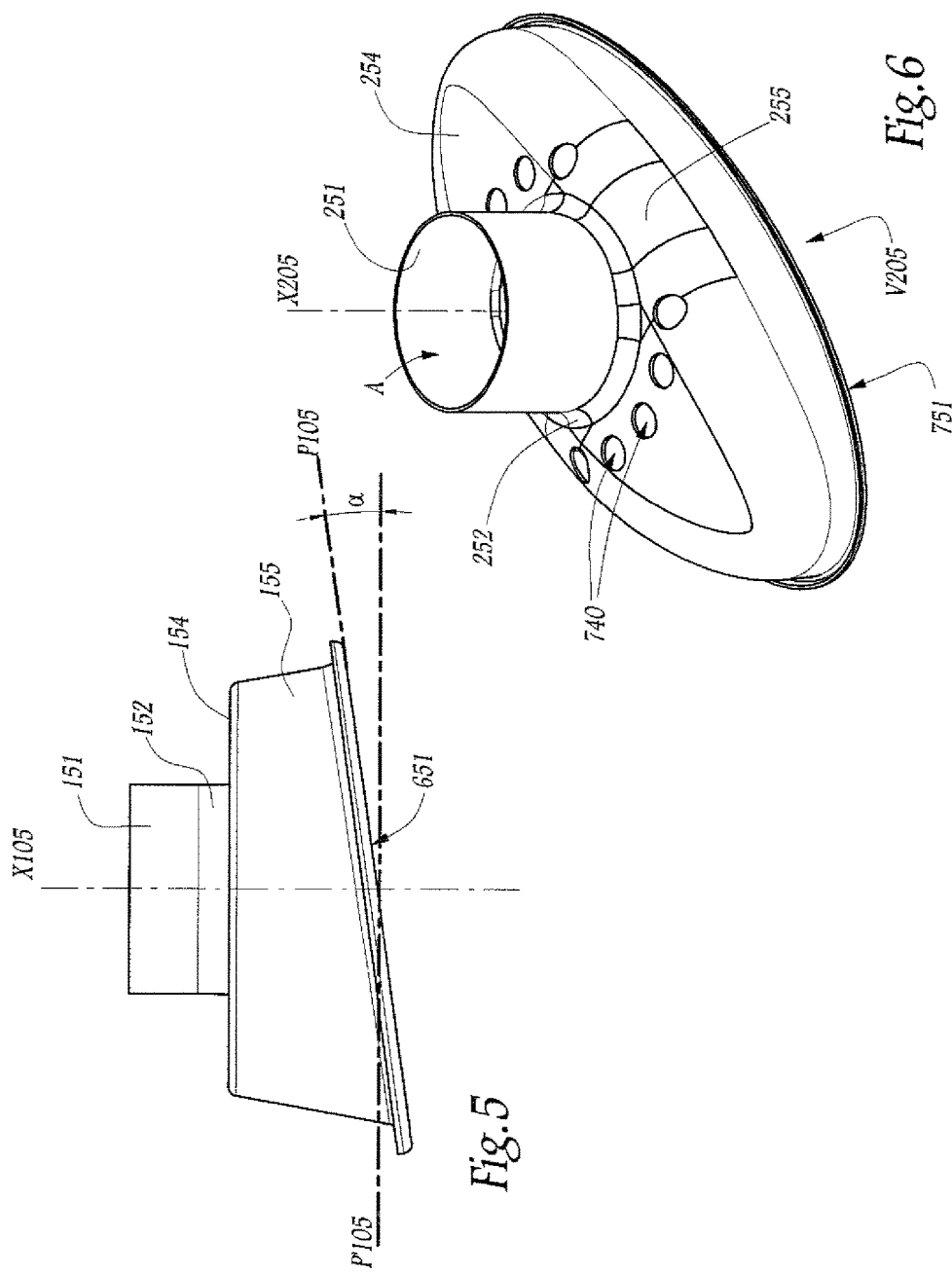

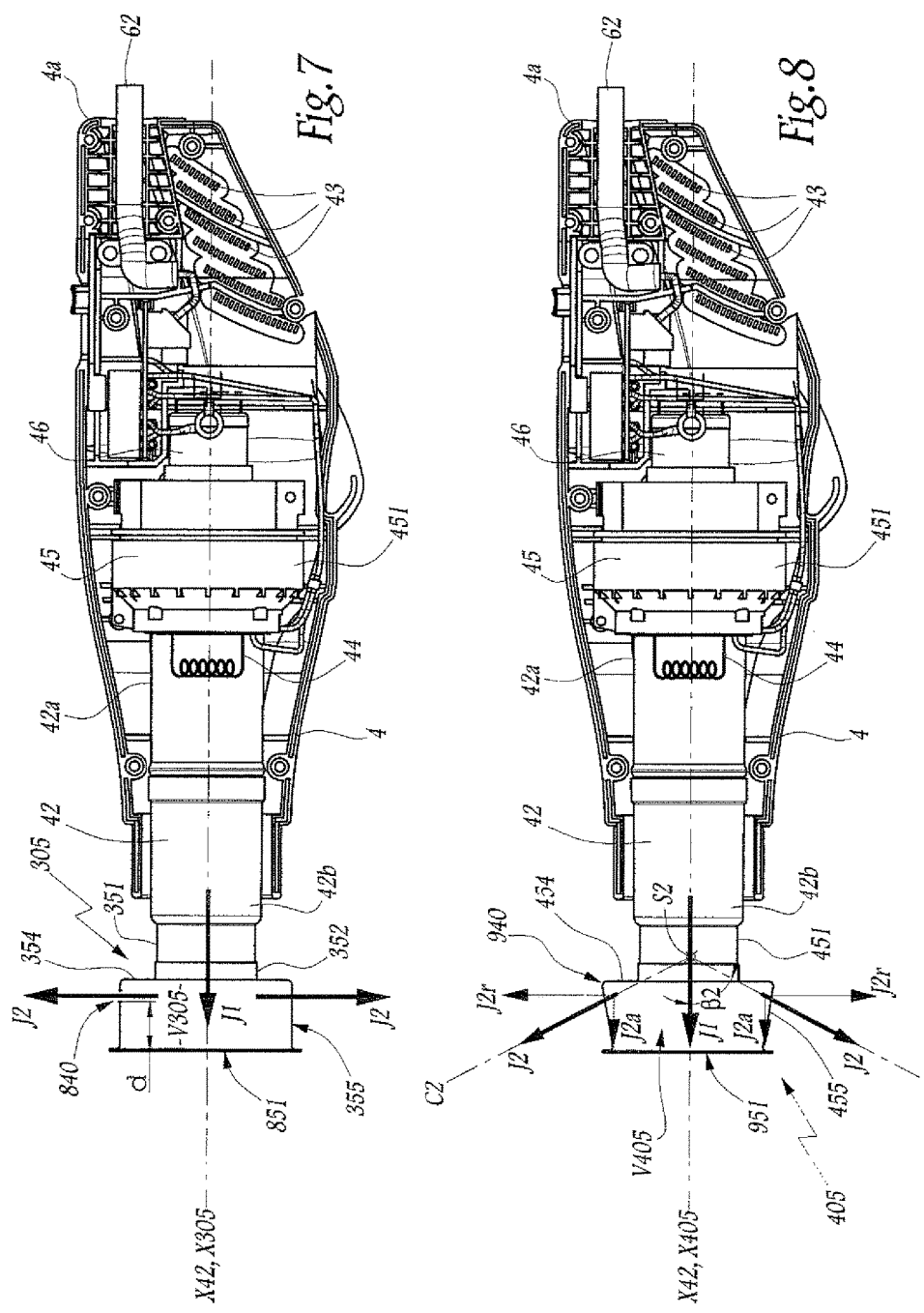

APPARATUS, ASSEMBLY AND METHOD FOR MANUAL AND LOCALIZED WEEDING

The present invention relates to a manual and localized weeding apparatus for treating weeds, as well as a weeding assembly comprising such an apparatus. Finally, the invention relates to a manual and localized weeding method.

Weeding apparatuses are known, appearing as a rod and comprising a tubular reservoir able to receive a phytosanitary Liquid which is sprayed on the plants to be destroyed. These apparatuses are not very economical and not very ecological since a phytosanitary liquid is required for destroying weeds.

Alternatively, there exist gas thermal apparatuses which have to be connected to a butane or propane gas cartridge or cylinder. A pressure-reducing valve is connected to the gas cylinder. The gas is ignited so as to burn the undesirable plants. These apparatuses are not very economical and not very ecological since they require a provision of gas. Further, considering the use of gas and the presence of a flame, they are dangerous. In addition, these apparatuses have to be handled in order to connect them to the gas cartridge or cylinder, which is not very convenient and may be dangerous in the case of mishandling.

Steam apparatuses are also known, which destroy weeds by the heat of the steam. These apparatuses have a relatively long heating time which is not very practical.

WO-A-91/14363 discloses a manual and localized weeding apparatus for treating weeds comprising a heat generator attached to a rod. The heat generator comprises a fan and a heating resistor which projects a jet of hot air into an inner volume of a bell. The thermal shock produced by the hot air jet destroys the weeds. No arrangement is provided for managing the hot air jet, once that the latter has destroyed the weed. Consequently, the hot air jot tends to escape from the bell either through the free edge, thus deteriorating the neighboring plants, or by flowing up towards the heat generator, which generates overheating with risk of damaging the apparatus.

These are the drawbacks for which the invention more particularly intends to find a remedy by proposing an efficient and accurate, practical, environment-friendly, manual and localized weeding apparatus, for which safety of use is optimum and which is economical.

For this purpose, the object of the invention is a manual and localized weeding apparatus comprising a rod. According to the invention, the apparatus comprises:
- a heat generator which is attached to the rod and which comprises a fan and a heating resistor,
- a bell provided with a free edge for supporting the apparatus on the ground and at least one hole for discharging an air jet from an inner volume of the bell, the hole being separated from the free edge by a distance of more than 2 cm.

By means of the invention, the thermal shock produced by the hot air jet destroys the weeds. The apparatus therefore does not require the use of a gas or a phytosanitary liquid. The hot air is only directed on undesirable plants by which it is possible not to destroy the neighboring plants. The apparatus is practical to use since it is ready to use and does not require any preliminary handling. The apparatus is environment-friendly since it does not discharge any carbon dioxide or waste materials. The safety of the apparatus is optimum since there is no flame, which suppresses the risks of explosion and the risks of gas leaks. The apparatus consumes very little energy, which makes its use economical.

According to advantageous but not mandatory aspects of the invention, such a weeding apparatus may incorporate one or several of the following features, taken in any technically acceptable combination:
- The free edge extends in a plane tilted by an angle comprised between 1° and 30°, relatively to a plane perpendicular to a direction of a hot air jet generated by the heat generator.
- The air jets delimit the side surface of a cone, the apex of which is turned towards the side of the free edge of the bell relatively to the heat generator, the cone being flared in a direction from the free edge to the heat generator.
- A half angle at the apex of the cone is comprised between 10° and 90°, preferably between 20° and 70°.
- The air jets delimit the side surface of a cone, the apex of which is turned towards the side of the heat generator relatively to the free edge of the bell, the cone being flared in a direction from the heat generator to the free edge.
- A half-angle at the apex of the cone is greater than 60°.

The invention also relates to a manual and localized weeding assembly comprising such an apparatus and at least one additional bell which may be adapted on a body of the heat generator.

Advantageously, each bell has a different geometry.

The invention also relates to a manual and localized weeding method comprising steps wherein:
- a hot air jet is generated by circulating air in contact with a heating resistor,
- over a weed, a bell is laid, which comprises at least one hole, with a free edge of the bell bearing upon the ground, the hole being separated by a distance of more than 2 cm from the free edge,
- the hot air jet is directed into an inner volume of the bell,
- the hot air jet is discharged from the bell as a secondary jet passing through the hole.

Advantageously, the temperature of the hot air jet is above 100° C., preferably above 400° C. The invention will be better understood and other advantages thereof will become more clearly apparent in the light of the description which follows, of a manual and localized weeding apparatus and assembly according to the invention, only given as an example and made with reference to the appended drawings wherein:

FIG. 2 is a sectional view according to the plane P2 in FIG. 1;

FIG. 3 is a perspective view of a bell which is part of the apparatus of FIG. 1;

FIG. 4 is a similar view to that of FIG. 3 of a second bell which is part of a weeding assembly comprising the apparatus of FIG. 1;

FIG. 5 is a side view of the bell of FIG. 4;

FIG. 6 is a perspective view of a third bell belonging to the weeding assembly;

FIG. 7 is a similar view to that of FIG. 2 showing a body of the apparatus equipped with a fourth bell belonging to the weeding assembly;

FIG. 8 is a similar view to that of FIG. 2 showing a body of the apparatus equipped with a fifth bell belonging to the weeding assembly.

Figure 1:
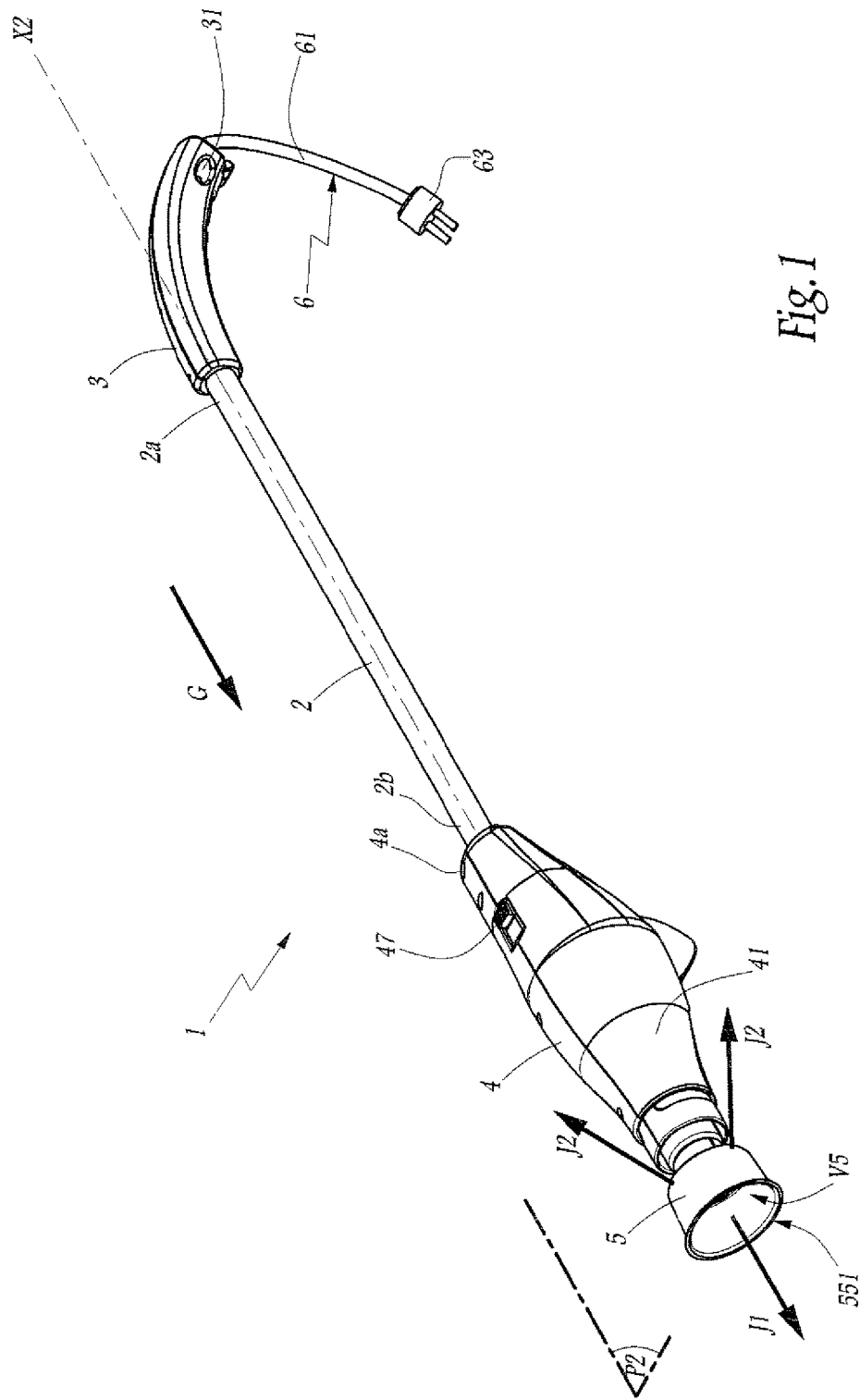
FIG. 1 is a perspective view of a weeding apparatus according to the invention.

FIG. 1 shows a manual and localized weeding apparatus 1 which comprises a hollow, rectilinear and metal rod 2, which extends along a longitudinal axis X2, a grip handle 3 and a heat generator 4 which, during the operation of the apparatus 1, projects a hot air jet J1 into a bell 5 provided for covering a plant to be destroyed.

In the following, the elements which are located along the axis X2 on the side of the handle 3 are described as «upper» elements. So-called «lower» elements are located on the side of the boll 5, along the axis X2.

In FIG. 1, the earth's gravity field G is illustrated, which defines the vertical. During operation, the axis X2 is placed parallel or with a slight tilt relatively to the field G. The handle 3 is then located at the top relatively to the bell 5.

The handle 3 is secured to an upper end 2a of the rod 2 and is slightly curved relatively to the axis X2 for facilitating handling of the apparatus 1 during its use. The handle 3 is in a plastic material and an opening hole 31 is made in the upper end of the handle. The hole 31 allows the apparatus 1 to be suspended with view to it being stored.

A lower end 2b of the rod 2 is attached to an upper end 4a of a body 41 of the heat generator 4. The body 41 is in plastic material and contains elements provided for heating and projecting the hot air jet J1, at a temperature T1 of the order of 600° C. According to the invention, the temperature T1 is preferably greater than 100° C., still preferably greater than 400° C.

A switch 47 for starting and stopping the heat generator 4 is provided on the body 41.

During operation, the heat generator 4 is powered with electric energy through a electricity distribution network, not shown. For this purpose, the apparatus comprises an electric power supply cable 6 ending with a male electric plug 63. The cable 6 comprises an upper portion 61, which extends between the plug 63 and the handle 3, and a lower portion 62 which passes inside the rod 2 and which is electrically connected to the heat generator 4.

As shown in FIG. 2, outdoor air intake apertures 43 are made in the body 41, in proximity to its upper end 4a. A fan 45 is placed inside the body 41, on the side of a lower end 4b of the body 41 relatively to the apertures 43. The fan 45 comprises a propeller which is not shown in FIG. 2 and which is located inside external fairing 451 of the fan 45. The propeller is driven into rotation by means of a direct current electric motor 46, placed on the side of the upper end 4a relatively to the fairing 451 of the fan 45. On the side of the lower end 4b, this fairing is connected to an upper end 42a of a conduit 42 which extends along a longitudinal axis X42 globally parallel to the axis X2 of the rod. A lower end 42b of the conduit 42 juts out outwards from the body 41. Inside the conduit 42, the heat generator 4 comprises a heating resistor 44. The heating resistor 44 is located on the side of the lower end 4b relatively to the fan 45.

During operation, the heating resistor 44 and the fan 45 are supplied with electric power. The fan 45 generates a depression which sucks up air outside the body 41. The outdoor air then passes through the apertures 43, is sucked up by the propeller, through the fairing 451 and projected into the conduit 42. The air is then heated by the heating resistor 44. The thereby formed hot air jet J1 is projected on the outside of the heat generator 4, at the lower end 42b of the conduit 42 and along the direction of the axis X42 of the conduit 42.

The bell 5, illustrated in more detail in FIG. 3, is removably mounted on the lower end 42b of the conduit 42. The bell 5 extends along an axis X5. The bell 5 is made from a material which withstands temperatures above 600° C., preferably above 900° C. For example, the bell 5 is in steel or aluminium metal sheet. Preferably, the bell 5 is in stainless steel in order to avoid its rusting. For example, the bell 5 may be made by die stamping.

The geometry of the bell 5 is only given as an example. The bell 5 comprises a connecting portion 51 which has the geometry of a hollow cylinder with a circular section along the axis X5 and which is provided for cooperating with the lower end 42b of the conduit 42 of the heat generator 4. More specifically, as shown in FIG. 2, the bell 5 is mounted around the lower end 42b of the conduit 42 and its upper end 5a bears against a shoulder 420 of the conduit 42. When the bell 5 is assembled to the body 41, the axes X42 and X5 are parallel and coincide. The connecting portion 51 is located along the axis X5 at an upper end 5a of the bell 5. A lower end of the bell 5 located opposite to the upper end 5a is noted as 5b.

The connecting portion 51 is extended, along the axis X5 and on the side of the lower end 5b, by a flared portion 52. The flared portion 52 is extended towards the upper end 5a by a radial wall 53. A ring-shaped exhaust wall 54, centered on the axis X5, is connected to the radial wall 53. Several regularly spaced out holes 540 are made in the exhaust wall 54. The holes 540 are made along a circular contour of axis X5. The exhaust wall 54 is extended towards the lower end 5b by a frustro-conical side wall 55 with a circular section, the large diameter end of which is located on the side of the lower end 5b of the bell 5. A lower edge 551 of the side wall 55 is located on the side of the lower end 5b of the bell 5. The lower edge 551 is a free edge which extends in a plane P5 perpendicular to the axis X5.

An internal volume of the bell 5 is noted as V5. The connecting portion 51 defines, at the upper end 5a of the bell 5, an aperture A for inflow of the hot air jet J1 into the inner volume V5 of the bell 5. A ringshaped external groove 56 is delimited by the flared portion 52 and by the radial wall 53. The external groove 56 extends on the outside of the volume V5. Along a radial axis, i.e. an axis perpendicular to the axis X5 and passing through the axis X5, the external groove 56 is located between the connecting portion 51 and the exhaust wall 54.

The operation of the apparatus 1 is the following: The user mounts the bell 5 on the conduit 42 and connects the plug 63 to an electricity network. If need be, an electric extender cable may be used. Next, the user presses the switch 47 in order to start the apparatus 1 and grasps the handle 3. The user places the bell 5 above a weed which is wanted to be destroyed. The length of the rod 2 allows the user to remain standing. The weed is then confined in the inner volume V5 of the bell 5. The heat generator 4 projects the hot air jet J1 into the inner volume V5 of the bell 5. The hot air jet J1 is projected forwards, i.e. in a direction from the heat generator 4 and from the aperture A towards the free edge 551 of the bell 5. The hot air jet J1 heats the weed and destroys it in a few seconds. The hot air jet J1 comes into contact with the weed and is automatically discharged from the inner volume V5 of the bell through the holes 540, in the form of several secondary jets J2 illustrated in FIGS. 1 to 3. In the example of FIGS. 1 and 2, the secondary jets J2 are projected towards the rear, i.e. in a direction from the free edge 551 to the aperture A of the bell 5.

The direction of the secondary jets J2 is conditioned by the geometry of the exhaust wall 54 and of the apertures 540. Within the scope of the invention, as explained in more detail subsequently, this direction may vary.

As shown in FIG. 3, the secondary jets J2 have an axial component J2a and a radial component J2r, defined with reference to the axis X42 of the hot air jet J1. The axial component J2a is parallel to the axis X42 of the hot air jet J1 and is directed from bottom to top, i.e. towards the rear or from the bell 5 towards the handle 3. The radial component J2r cuts the axis X42 and is directed towards the outside of the apparatus 1. Alternatively, the radial J2r or axial J2a component may be zero. Here, the direction of the axial component J2a is opposite to the direction of the hot air jet J1.

The secondary jets J2 are thus globally discharged upwards or rearwards, i.e. opposite to the ground, along a direction slightly tilted relatively to the axis X42. In other words, the secondary jets J2 have a parallel direction or slightly tilted outwards from the apparatus 1, relatively to the earth's gravity field G. The secondary jets J2 are thus discharged from the bell 5, opposite to the bell 5, along a direction parallel or slightly tilted relatively to the axis X42 of the hot air jet J1.

The jets J2 delimit the side surface of a cone C1, the apex S1 of which is turned forwards, i.e. on the side of the free edge 551 relatively to the aperture A of the bell 5. In the example of FIGS. 1 and 2, the axis X42 is the axis of revolution of the cone C1.

The cone C1 widens rearwards, i.e. in a direction from the free edge 551 to the aperture A of the bell 5 and the heat generator 4. For each secondary jet J2, an angle β1 is defined which is the half-angle at the apex of the cone C1. Preferably, the angle β1 is comprised between 10° and 90°, still preferably between 20° and 70°.

In this way, the plants in the vicinity of the weed to be destroyed do not risk being deteriorated. The jets J2 are discharged from the bell 5 radially so as not to be directed towards the body 41 of the heat generator 4, which gives the possibility of avoiding overheating of the heat generator 4.

The edge 551 of the bell 5 bears upon the ground, which facilitates the positioning of the apparatus 1 relatively to the weed.

The inner section of the lower end 42b of the conduit 41 is larger than or equal to the sum of the sections of the holes 540. In other words, the sum of the sections of the secondary jets J2 is less than or equal to the section of the hot air jet J1. In this way, a slight overpressure is generated in the inner volume V5 of the bell 5, which promotes destruction of the weed without overheating the heating resistor 44. Indeed, overheating of the heating resistor 44 may damage it.

Alternatively, there is no overpressure and the sum of the sections of the secondary jets J2 is greater than or equal to the section of the hot air jet J1. In this alternative, the sum of the sections of the secondary jets J2 is greater than or equal to the section of the hot air jet J1.

Several alternatives allow the jets J2 to be discharged rearwards, opposite to the free edge 551. For example, the holes 540 may be pierced obliquely relatively to the axis X5 or tilted nozzles may be formed at each hole 540, for example, by die-stamping.

The geometry of the bells 5, 105, 205, 305 and 405 illustrated in the figures is only given as an example. According to the invention, the bells 5, 105, 205, 305 and 405 may have other geometries insofar that the exhaust wall and the holes for letting through the secondary jets J2 are designed so that the secondary jets J2 are discharged from the inner volume of the bell, with a distance d between the free edge and the exhaust holes of more than 2 cm. The exhaust wall of the bell may for example be conical or hemi-spherical.

A weeding method according to the invention comprises steps wherein:

a bell 5 is laid over a weed, with the free edge 551 of the bell 5 bearing upon the ground; the weed is then found in the inner volume V5 of the bell 5, the hot air jet J1 is directed into the inner volume V5 of the bell 5, the hot air jet J1 is discharged from the bell 5 through each hole 540, each hole 540 being separated away from the free edge 551 by a distance d of more than 2 cm. Optionally, the hot air jet J1 is discharged opposite to the free edge 551 of the bell 5, along a direction globally opposite to the direction of the hot air jet J1.

FIGS. 4 and 5 show a second bell 105 with an axis X105, which is quasi-identical with the first bell 5 and which defines an internal volume V105. The elements of the second bell 105 similar to those of the first bell 5 bear the same numerical references, increased by 100. Thus, the bell 105 comprises a connecting portion 151, a flared portion 152, a radial wall 153, an exhaust wall 154, in which holes 640 are made, and a side wall 155. A lower edge 651 of the side wall 155 extends in a plane P105 which is slightly tilted by a non-zero angle α relatively to a plane P'105 perpendicular to the axis X105. The angle α is comprised between 1° and 30°. This tilt facilitates use of the apparatus 1 in particular when the user moves forward.

FIG. 6 shows a third bell 205 which extends along an axis X205. The bell 205 is globally like the bells 5 and 105 but defines an internal volume V205 with an elongated shape. The elements of the bell 205 similar to those of the bell 5 bear the same numerical references, increased by 200. Thus the bell 205 comprises a connection portion 251, a flared portion 252, an exhaust wall 254 and a side wall 255. The exhaust wall 254 is perpendicular to the axis X 205. Holes 740 like the holes 540 of the bell 5 are made in the exhaust wall 254. A lower edge 751 of the side wall 255 is of an elongated oblong shape and extends in a plane perpendicular to the axis X205. Alternatively, the lower edge 751 extends in a plane tilted relatively to a plane perpendicular to the axis 205, as explained with reference to the bell 105.

The elongated shape of the inner volume V205 of the bell 205 is suitable for destroying plants which for example are growing between tiles of a terrace.

FIG. 7 shows a fourth bell 305 which extends along an axis X305. The bell 305 is globally like the bells 5, 105, and 205 but the geometry of the bell 305 is defined so that the secondary jets J2 only escape radially through holes 840. The elements of the bell 305 similar to those of the bell 5 bear the same numerical references, increased by 300. Thus, the bell 305 comprises a connecting portion 351, a flared portion 352, an upper wall 354 and a radial side wall 355. The side wall 355 has the shape of a side wall of a cylinder of axis X305. Holes 840 are made in the radial wall 355. For each secondary jet J2, the axial component J2a is zero. The secondary jets J2 are directed outwards from the apparatus. In order to avoid destroying the neighboring plants during operation of the apparatus 1, each exhaust hole 840 is separated from a free edge 851 of the bell 305 by a distance d of more than 2 cm. Upon exiting the inner volume 305 of the bell 305, the secondary jets J2 carry away by the Venturi effect some outdoor air at room temperature, thereby cooling the secondary jets J2. Therefore, the temperature of the secondary jets J2 upon exiting the bell 305, is not dangerous for the user and is not of a nature for destroying the neighboring plants.

FIG. 8 shows a fifth bell 405 which extends along an axis X405 and delimits an inner volume V405. The bell 405 is globally like the bells 5, 105, 205 and 305 but the majority of the bell 405 is defined so that the axial component J2a of the secondary jets J2 is directed forwards, in the same direction as the hot air jet J1, i.e. from the heat generator 4 towards the bell 405, in other words from the aperture A towards the free edge 951 of the bell 405. In this case, the radial component J2r is non-zero. The elements of the bell 405 similar to those of the bell 5 bear the same numerical references, increased by 400. Thus, the bell 405 comprises a connecting portion 451, an upper wall 454 and a side wall 455. For example, the side wall 455 has the shape of a cone, the apex of which is turned towards the side of the free edge 951 relatively to the aperture A of the bell 405. Holes 940 are made in the side wall 455. In order to avoid destroying neighboring plants, each exhaust hole 940 is separated by a distance d of more than 2 cm from the free edge 951 of the bell 405. The secondary jets J2 are directed outwards from the apparatus 1. In this alternative, the geometry of the bell 405 is defined so that the secondary jets J2 delimit the side surface of a cone C2, the apex S2 of which is turned towards the side of the heat generator 4 relatively to the free edge 951 of the bell 405. The cone 02 is thereby flared in a direction from the heat generator 4 to the free edge 951. Preferably, a half-angle β2 at the apex of this cone C2 is greater than 60°.

Figure 9:
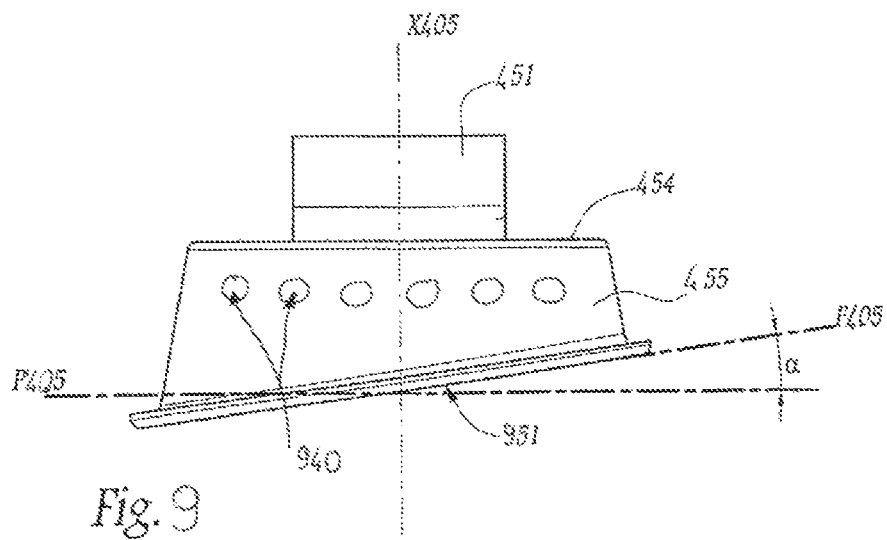
FIG. 9 is a similar view to that of FIG. 5 for the embodiment shown in FIG. 8.

FIG. 9 shows a similar view to that of FIG. 5 for the embodiment shown in FIG. 8. Like numerals correspond to like elements previously described. In FIG. 9, the lower edge 951 of the side wall 455 extends in a plane P405 which is slightly tilted by a non-zero angle α relative to a plane P'405 perpendicular to the axis X405. The angle α is comprised between 1° and 30°.

In another alternative not shown, the bell defines a hemispherical internal volume and comprises a connecting portion which extends along a longitudinal axis of the bell, coinciding with the direction of the hot air jet, on the one hand. This connecting portion is extended on the side of the circular free edge of the bell by a hemispherical wall. The exhaust holes for the secondary jets are made in the hemispherical wall. Depending on their position, the secondary jets are discharged in different directions. In particular, the holes may be made so that the secondary jets are discharged from the inner volume along a direction forming an angle of about 45° with the direction of the hot air jet J1.

The apparatus 1 equipped with its bell 5 and the additional bells 105, 205, 305 and 405 are part of a weeding assembly. The user may thereby select a bell suitable for his/her needs.

In an alternative not shown, the weeding assembly comprises a number of additional bells of more than four, which may have diverse geometries adapted to various applications.

Alternatively, the holes 540, 640, 740, 840 and 940 are not circular. These may be slots or grids.

The alternative described in the present description may be combined together either totally or partly.

The invention claimed is:

1. A manual and localized weeding apparatus comprising a heat generator attached to a rod, the heat generator including a fan and a heating resistor and projecting a hot air jet into an inner volume of a bell, the bell having a free edge for supporting the apparatus on a support surface and defining an opening through which a weed extends into the inner volume of the bell to kill the weed,
   wherein the bell is provided with a plurality of discharge holes provided in a lateral exhaust wall of the bell and each discharge hole is oriented to direct a hot exhaust air jet outwardly relative to the lateral wall of the bell for continuously discharging the exhaust air from the inner volume of the bell,
   wherein each discharge hole defines a constantly open cross sectional exhaust opening regardless if an axis X2 of the apparatus is parallel, or at a tilt angle, relative to a direction of the earth's gravity field G,
   wherein the exhaust air jets delimit the side surface of a cone, the apex of which is turned towards the side of the heat generator relative to the free edge of the bell, the cone being flared in a direction from the heat generator towards the free edge, and
   wherein the exhaust air jets have a non-zero axial component, directed from top to bottom, and a non-zero radial component, directed towards the outside of the apparatus.

2. The apparatus according to claim 1, wherein a half angle at the apex of the cone is greater than 60°.

3. A manual and localized weeding assembly, wherein it comprises an apparatus according to claim 1 and at least one additional bell which may be adapted on a body of the heat generator.

4. The assembly according to claim 3, wherein each bell has a different geometry.

5. The manual and localized weeding apparatus according to claim 1,
   wherein the bell is made from a material which withstands temperatures above 900° C.

6. A manual and localized weeding method, wherein using an apparatus including a heat generator including a fan and a heat resistor which are mounted to direct a hot air jet toward at least one bell having a free edge for supporting the apparatus on a support surface and wherein the free edge defines an opening for directing the hot air jet onto weeds to be killed, wherein the bell has a plurality of discharge holes for continuously discharging hot exhaust air from the inner volume of the bell, the plurality of discharge holes being oriented in generally equally spaced relationship from one another in a lateral exhaust wall of the bell with each hole being oriented to direct discharged hot exhaust air laterally relative to the bell and each hole being spaced from the free edge by a distance of more than 2cm, and wherein each of the plurality of discharge holes has a constantly open cross sectional exhaust opening regardless if the axis X2 of the apparatus is parallel, or at a tilt angle, relative to a direction of the earth's gravity field G, the method comprising the steps of:
   placing the bell over a weed with the free edge of the bell bearing upon a ground surface about the weed,
   generating a hot air by using the fan to circulate air in contact with the heating resistor and directing the hot air jet into an inner volume of the bell to destroy the weed by heating, and
   continuously discharging hot air from the bell in the form of secondary exhaust air jets passing laterally through the plurality of discharge holes in the lateral exhaust wall of the bell, said exhaust air jets being discharged either with a zero axial component along the axis X2 of the apparatus or along the surface of a cone having an apex turned towards the side of the heat generator relative to the free edge of the bell, the cone being flared in the direction from the heat generator towards the free edge, said exhaust air jets having a non-zero radial component directed towards the outside of the apparatus.

7. The method according to claim 6, wherein the temperature of the hot air jets is above 100° C.

8. The method according to claim 6, wherein the temperature of the hot air jets is above 400° C.

9. A manual and localized weeding apparatus comprising a heat generator attached to a rod, the heat generator including a fan and a heating resistor and projecting a hot air jet into an inner volume of a bell, the bell having a free edge for supporting the apparatus on a support surface and defining an opening through which a weed extends into the inner volume of the bell to kill the weed, wherein the bell is provided with a plurality of discharge holes provided in a lateral exhaust wall of the bell and each discharge hole is oriented to direct a hot exhaust air jet outwardly relative to the lateral wall of the bell for continuously discharging the exhaust air from the inner volume of the bell, wherein each discharge hole defines a constantly open cross sectional exhaust opening regardless if an axis X2 of the apparatus is parallel, or at a tilt angle, relative to a direction of the earth's gravity field G, wherein the exhaust air jets have a zero axial component along the axis X2 of the apparatus, and wherein the exhaust air jets have a non-zero radial component directed towards the outside of the apparatus.

10. The apparatus of claim 9 wherein the bell is made from a material which withstands temperatures above 900° C.

11. A manual and localized weeding assembly, wherein it comprises an apparatus according to claim 9 and at least one additional bell which may be adapted on a body of the heat generator.

12. The assembly according to claim 11, wherein each bell has a different geometry.

* * * * *